United States Patent
Kelleher et al.

(10) Patent No.: US 10,021,902 B2
(45) Date of Patent: *Jul. 17, 2018

(54) INJECTABLE PROTEIN PRODUCT

(71) Applicant: Proteus Industries, Inc., Gloucester, MA (US)

(72) Inventors: Stephen D. Kelleher, Ipswich, MA (US); William R. Fielding, Hilton Head, MA (US); Wayne S. Saunders, Gloucester, MA (US); Peter G. Williamson, Gloucester, MA (US)

(73) Assignee: Proteus Industries, Inc., Gloucester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,592

(22) Filed: Sep. 15, 2017

(65) Prior Publication Data

US 2018/0000138 A1    Jan. 4, 2018

Related U.S. Application Data

(63) Continuation of application No. 15/274,076, filed on Sep. 23, 2016, now Pat. No. 9,795,160, which is a continuation of application No. 12/798,423, filed on Apr. 5, 2010, now Pat. No. 9,491,956.

(51) Int. Cl.
| | |
|---|---|
| *A23J 1/02* | (2006.01) |
| *A23L 13/40* | (2016.01) |
| *A23J 1/04* | (2006.01) |
| *A23L 17/00* | (2016.01) |

(52) U.S. Cl.
CPC ............. *A23L 13/42* (2016.08); *A23J 1/02* (2013.01); *A23J 1/04* (2013.01); *A23L 13/40* (2016.08); *A23L 17/00* (2016.08); *A23V 2002/00* (2013.01)

(58) Field of Classification Search
CPC .. A23J 1/02; A23L 13/03; A23L 13/42; A23L 17/40; A23L 13/72; A23L 17/00; A23L 17/75; A23L 13/57
USPC .......................................... 426/657; 530/350
See application file for complete search history.

(56) References Cited

U.S. PATENT DOCUMENTS

| | | | |
|---|---|---|---|
| 2,282,801 A | 5/1942 | Musher | |
| 2,470,281 A | 5/1949 | Allingham | |
| 3,406,081 A | 10/1968 | Bauer et al. | |
| 3,451,826 A | 6/1969 | Mulder | |
| 4,031,261 A | 6/1977 | Durst | |
| 4,935,251 A | 6/1990 | Verhoef et al. | |
| 6,005,073 A | 12/1999 | Hultin et al. | |
| 6,136,959 A | 10/2000 | Hultin et al. | |
| 6,288,216 B1 | 9/2001 | Hultin et al. | |
| 6,451,975 B1 | 9/2002 | Hultin et al. | |
| 6,855,364 B2 | 2/2005 | Kelleher et al. | |
| 7,163,707 B2 | 1/2007 | Kelleher et al. | |
| 7,473,764 B2 | 1/2009 | Hultin et al. | |
| 7,556,835 B2 | 7/2009 | Hultin et al. | |
| 2004/0058035 A1 | 3/2004 | Kelleher et al. | |
| 2004/0067551 A1 | 4/2004 | Hultin et al. | |
| 2004/0224079 A1 | 11/2004 | Kelleher et al. | |
| 2005/0064085 A1 | 3/2005 | Kelleher | |
| 2005/0233060 A1 | 10/2005 | Kelleher et al. | |
| 2009/0269440 A1 | 10/2009 | Hardin | |
| 2011/0244092 A1 | 10/2011 | Kelleher et al. | |
| 2011/0244093 A1 | 10/2011 | Kelleher et al. | |

FOREIGN PATENT DOCUMENTS

| | | |
|---|---|---|
| EP | 0848911 A2 | 6/1998 |
| GB | 2097646 | 11/1982 |
| WO | WO 2004/028280 | 4/2004 |
| WO | WO2011126469 A1 | 10/2011 |
| WO | WO2011126470 A1 | 10/2011 |

OTHER PUBLICATIONS

Omana D. A. et al., "Alkali-aided Protein Extraction from Chicken Dark Meat: Chemical and Functional Properties of Recovered Proteins," *Process Biochemistry*, 45:375-381 (2010).
Mienke et al., "Some Factors Influencing the Production of Protein Isolates from Whole Fish," *Journal of Food Science*, 34:195-198 (1972).
International Search Report and Written Opinion from PCT/US2010/002041 (dated Apr. 14, 2011).
European Search Report for EP application 10849576.3 (dated Jan. 14, 2015).
European Search Report for EP application 10849575.5 (dated Jul. 23, 2014).
International Search Report and Written Opinion from PCT/US2010/002926 (dated Jan. 5, 2011).
Hamm R, Functional Properties of Myofibrillar System and Their Measurements, in: Muscle as Food, Academic Press, Inc, New York, pp. 135-199 (1986).

*Primary Examiner* — Vera Stulii

(74) *Attorney, Agent, or Firm* — Antoinette G. Giugliano; AGG Intellectual Property Law

(57) ABSTRACT

Moisture is retained in cooked or thawed food by adding to the food an aqueous suspension of animal muscle protein obtained from animal muscle tissue. The aqueous suspension is obtained by mixing comminuted animal muscle tissue with a food grade acid to form an aqueous acidic solution of animal muscle protein. The acidic solution is mixed with a food grade base to precipitate the protein in an aqueous composition. The precipitated protein then is comminuted to form an aqueous suspension of comminuted animal muscle protein.

25 Claims, No Drawings

INJECTABLE PROTEIN PRODUCT

REFERENCE TO RELATED APPLICATION

This application is a continuation of U.S. application Ser. No. 15/274,076, entitled, "Injectable Protein Product" by Stephen D. Kelleher et al., filed Sep. 23, 2016, which is a continuation of U.S. application Ser. No. 12/798,423, entitled, "Protein Product and Process for Making Injectable Protein Product" by Stephen D. Kelleher, et al., filed Apr. 5, 2010.

The entire teachings of the above applications are incorporated herein by reference.

BACKGROUND OF THE INVENTION

This invention relates to a novel protein composition derived from animal muscle tissue, a process for making the protein composition and to a process for retaining moisture in food, cooked or uncooked.

At the present time, it is desirable to retain moisture in cooked or uncooked food so that drying of the food during the cooking process is minimized. It is also desirable to retain moisture in cooked or uncooked food so that the natural food flavors are retained in the food even after cooking.

A common occurrence of moisture loss occurs when a frozen food is thawed such as prior to cooking the food. The thawed food experiences drip loss wherein a liquid aqueous composition such as water is formed and becomes separated from the solid thawed food.

A second common occurrence of moisture loss occurs when an uncooked food is cooked. Liquid moisture in the food becomes vaporized during the cooking process and migrates to the food surface where it evaporates or separates as a liquid from the solid food being cooked.

At the present time, a variety of additive compositions are added to food, primarily by injection, by vacuum tumbling and/or with syringes. Prior attempts to retain moisture in cooked meat or fish with additives have included the use of sodium tripolyphosphate, starches, vegetable fibers, a coating of fat free flour based batter containing an egg white substitute (U.K. Patent Application 2,097,646), water-in-oil emulsion (U.S. Pat. No. 3,406,081), protein or protein isolate and a fat (U.S. Pat. Nos. 4,031,261 and 4,935,251), milk solids (U.S. Pat. No. 2,282,801) and lecithin (U.S. Pat. Nos. 2,470,281 and 3,451,826).

An example of such a composition also is disclosed in U.S. Pat. No. 6,855,364 wherein an acidic protein composition derived from animal muscle tissue is added to a food prior to cooking in order to retain moisture in the food during cooking. The acidic protein composition is one obtained by mixing a food grade acid composition with comminuted animal muscle tissue to obtain an acidic protein composition. Suitable processes for obtaining the acidic protein composition are disclosed in U.S. Pat. Nos. 6,005,073; 6,288,216; 6,136,959; 6,451,975 and/or 7,433,764 all of which are incorporated herein by reference in their entirety.

Accordingly, it would be desirable to provide a form of fish or meat which can be thawed and/or cooked while retaining its moisture and natural flavors or added flavors. In addition, it would be desirable to provide such a form of fish or meat wherein the majority of moisture or added flavors in the uncooked fish or meat is retained during cooking.

SUMMARY OF THE INVENTION

In accordance with this invention, it has been found that a novel animal muscle protein composition comprising sarcoplasmic proteins and myofibrillar proteins derived from animal muscle tissue provides improved moisture retention in food being thawed or cooked. The animal muscle protein composition is obtained from animal muscle tissue by comminuting the animal muscle tissue and then mixing it with a food grade acid composition under conditions to solubilize the animal muscle protein thereby forming a solution of animal muscle protein. The solubilized acidic animal muscle tissue then is mixed with a food grade base composition to increase the pH of the solubilized animal muscle protein to a pH between about 4.7 and about 11.0, preferably between about pH 5.5 and about 9.5, thereby to precipitate the protein. The precipitated protein then is comminuted to form protein particulates suspended in an aqueous medium. It has been found that when the animal muscle protein composition prepared by the process of this invention is added to a food to be thawed and/or cooked, increased moisture retention in the food is observed as compared to an acidic animal muscle tissue protein composition or an alkaline animal muscle tissue protein composition obtained without the first step of forming an acidic animal muscle composition formed from animal muscle tissue.

This result is surprising since the protein compositions are chemically the same. While applicants do not wish to be bound to any theory explaining this surprising result, it is believed that by first mixing the animal muscle tissue with a food grade acid, unfolding of the protein molecules is promoted and the subsequent mixing of the protein with a food grade alkaline compound results in an increase in functionality of the protein. This increase in functionality promotes increased moisture retention in the food being treated with the protein.

In addition, it has been found that the comminuted animal muscle protein composition of this invention can be injected into food when pumped through a syringe while avoiding protein precipitation within the syringe which blocks the fluid pathway through the syringe. In contrast, it has been found that when the precipitated protein which has been mixed first with an acid and then with a base but is not comminuted blocks the fluid pathway of a syringe within seconds after pumping of the protein composition is initiated. In addition, it has also been found that when the precipitated protein which has been mixed first with an acid and then with a base and additionally mixed with salt, for flavoring, and then comminuted does not block the fluid pathway of the syringe. This is not true for proteins held at the low pH or proteins that go directly to high pH in contrast to proteins that are adjusted to low pH prior to adjustment to a high pH. Also, in contrast to the composition of this invention, animal muscle tissue which has been solubilized with an acid composition to form acidic animal muscle protein which is comminuted or not comminuted blocks the fluid pathway of a syringe within seconds after initiating pumping through the syringe. The fact that these protein compositions block the fluid pathway through the syringe renders them useless for injecting a food with a syringe. In addition, the protein composition mixed first with an acid and then with a base and not comminuted or is mixed only with an acid and comminuted or not comminuted can not be adequately injected into a food by vacuum tumbling since they are retained on the surface of the food and do not satisfactorily penetrate the food surface.

The animal muscle protein composition of this invention can be derived from any form of animal muscle tissue including that obtained from fish, poultry such as chicken, shellfish such as shrimp, lamb, beef, pork or the like.

When moisture is to be retained in food to be thawed and/or food to be cooked, the protein composition of this invention is first added to the food including mixing the protein composition with the food or injecting the protein composition into the food such as by vacuum tumbling and/or with a syringe.

DESCRIPTION OF SPECIFIC EMBODIMENTS

In accordance with this invention, in a first step, the acidic muscle tissue protein comprising sarcoplasmic proteins and myofibrillar proteins is formed by comminuting animal muscle tissue and then mixing the comminuted animal muscle tissue with a food grade acid composition under conditions to solubilize the animal muscle tissue. Sufficient water also is added to the tissue to fully disperse it. The water and acid composition can be added in sequence or added together with the tissue. The resultant acidic animal muscle tissue protein solution has a pH of about 3.5 or less, preferably between about 2.0 and about 3.7, preferably between about 2.5 and about 3.5 but not so low as to adversely affect the protein functionality.

Any food grade or pharmaceutically acceptable acid that does not undesirably contaminate the acidic protein product can be used to lower the pH of the protein product, for example, organic acids (e.g., citric acid, ascorbic acid, malic acid or tartaric acid) or mineral acids (e.g., hydrochloric acid, phosphoric acid, sulfuric acid) or mixtures thereof. Acids that have significant volatility and impart undesirable odors, such as acetic acid or butyric acid, are undesirable. The animal muscle tissue is formed into small tissue particles which are then mixed with sufficient acid to form a solution of the tissue having a pH of 3.5 or less, but not such a low pH as to adversely modify the animal muscle tissue protein. In one process, the solution is centrifuged to form a lowest membrane lipid layer, an intermediate layer of aqueous acidic protein solution and a top layer of neutral lipids (fats and oils). The intermediate layer of aqueous acidic protein solution then is separated from the membrane lipid layer or from both the membrane lipid layer and the neutral lipid layer. In a second process, no centrifugation step is effected since the starting animal muscle tissue contains sufficiently low concentrations of undesired membrane lipids, oils and/or fats as to render a centrifugation step unnecessary. In both processes, the protein composition formed is free of myofibrils and sarcomeres.

The acidic animal muscle protein solution then is mixed with a food grade or pharmaceutically acceptable alkaline composition to raise the pH of the acidic solution to a pH of between about 4.7 and about 11.0, preferably between about 5.5 and about 9.5 to precipitate the animal muscle protein. Representative suitable alkaline compositions include sodium hydroxide, potassium hydroxide, sodium bicarbonate, potassium bicarbonate or mixtures thereof or the like. The precipitated animal muscle protein then is comminuted into fine particles such as with apparatus having one or more rotating blades or one or more reciprocating blades thereby to form an aqueous suspension of animal muscle proteins.

The aqueous suspension of animal muscle protein is admixed with comminuted meat or whole fish, fish fillets, whole pieces of meat or injected into meat or fish. Injection can be effected in any manner such as with a syringe or by vacuum tumbling or both. It has been found that when the resultant meat or fish is thawed or the resultant meat or fish is cooked, the thawed or cooked meat or fish retains significantly greater moisture as compared to meat or fish not containing the protein composition of this invention.

The protein products utilized in the present invention comprise primarily myofibrillar proteins that also contain significant amounts of sarcoplasmic proteins. The sarcoplasmic proteins in the protein product admixed with or injected into the animal muscle tissue comprises above about 8%, preferably above about 10%, more preferably above about 18%, up to about 30% by weight sarcoplasmic proteins, based on the total weight of protein.

In one aspect of this invention, particulate meat or fish such as ground meat or fish, e.g., hamburger, is mixed with the protein suspension comprising myofibrillar proteins and sarcoplasmic proteins at a weight ratio usually comprising about 0.03 to about 18% weight of the protein mixture based on the weight of the uncooked meat or fish, preferably between about 0.5 and 10% weight based on the weight of uncooked meat or fish and most preferably comprising between about 0.5 to about 5% weight based on the weight of the uncooked meat of fish. When utilizing less than about 0.3% weight of the protein suspension of this invention, effective moisture retention is not observed.

The animal muscle tissue which is modified to retain moisture in accordance with this invention comprises meat and fish, including shell fish. Representative suitable fish include deboned flounder, sole, haddock, cod, sea bass, salmon, tuna, trout or the like. Representative suitable shell fish include shrimp, crabmeat, crayfish, lobster, scallops, oysters, or shrimp in the shell or the like. Representative suitable meats include ham, beef, lamb, pork, venison, veal, buffalo or the like; poultry such as chicken, mechanically deboned poultry meat, turkey, duck, goose or the like either in fillet form or in ground form such as hamburg. The meats can include the bone of the animal when the bone does not adversely affect the edibility of the meat such as spare ribs, lamb chops or pork chops. In addition, processed meat products which include animal muscle tissue such as a sausage composition, a hot dog composition, emulsified product or the like can be injected or mixed with the protein suspension of this invention or a combination of these protein addition methods. Sausage and hot dog compositions include ground meat or fish, herbs such as sage, spices, sugar, pepper, salt and fillers such as dairy products as is well known in the art.

The fish or meat containing the protein suspension of this invention then can be cooked in a conventional manner such as by baking, broiling, deep fat frying, in a microwave oven or the like. It has been found that the cooked meat or fish provided in accordance with this invention weighs between about 1 and about 20%, more usually between about 4% and about 9% by weight greater than cooked untreated meat or fish starting from the same uncooked weight. In addition, with frozen meat or fish containing the protein suspension, drip loss from the food is reduced between about 4 and about 15% as compared with meat or fish not containing the protein suspension of this invention.

The following examples illustrate the present invention and are not intended to limit the same. Percent (%) in Tables 1 through 10 reflects the comparative loss of moisture in the controls verses the moisture loss in the compositions of this invention (moisture content of a composition of this invention/moisture content of control X 100).

EXAMPLE 1

This example illustrates that the protein composition made by the method of this invention provides an improved increase in moisture retention in fish or shellfish as compared to an acidic protein composition not mixed with an alkaline composition. The acidic protein composition shown in Tables 1, 2, 3 and 4 (shown below) were processed by mixing comminuted fish muscle protein with a food grade acidic composition comprising phosphoric acid to obtain a protein solution having a pH of 3.0. The protein compositions of this invention were obtained by mixing comminuted fish muscle protein or shrimp muscle protein with a food grade acidic composition comprising phosphoric acid to obtain a pH of 3.0 in a first step. In a second step, a food grade alkaline composition comprising sodium hydroxide was added to the acidic protein solution to precipitate the protein having a pH of 5.5 or 7.3 (Tables 1, 2 and 3 shown below) or a pH of 7.5, 7.8, 8.5 or 9.5 (Table 4 shown below). The precipitated protein in each instance was comminuted with a Stephan microcut apparatus having two rotating blades to form a suspension of protein and an aqueous medium having a pH shown in Tables 1, 2, 3 and 4. Each protein composition made from muscle protein as described herein was injected into the animal muscle tissue of the species from which the protein compositions were obtained. The animal muscle tissue was then frozen followed by being thawed. Controls were supplied to which no protein was added. The animal muscle tissue samples were weighed prior to injection, subsequent to injection and subsequently to being frozen and then thawed.

As shown in Table 1, moisture retention with the protein composition of this invention improved over moisture retention with the acidic protein composition by more than 7%.

As shown in Table 2, moisture retention with the protein composition of this invention improved over moisture retention with the acidic protein composition by more than 9%.

As shown in Table 3, moisture retention with the protein composition of this invention improved over moisture retention with the acidic protein composition by more than 4%.

As shown in Table 4, moisture retention with the protein composition of this invention improved over moisture retention with the acidic protein composition by more than 6%.

EXAMPLE 2

This example illustrates that the protein composition made by the method of this invention provides an improved increase in moisture retention in fish or shellfish as compared to an acidic protein composition not mixed with an alkaline composition. The acidic protein composition shown in Table 5 (shown below) was processed by mixing comminuted fish muscle protein with a food grade acidic composition comprising phosphoric acid to obtain a protein solution having a pH of 3.0. The protein compositions of this invention were obtained by mixing comminuted fish muscle protein or comminuted shrimp muscle protein with a food grade acidic composition comprising phosphoric acid to obtain a pH of 3.0 in a first step. In a second step, a food grade alkaline composition comprising sodium hydroxide was added to the acidic protein solution to precipitate the protein having a pH of 5.5 or 7.3 (Table 5 shown below) or a pH of 8.5 (Table 6 shown below). The precipitated protein in each instance was comminuted with a Stephan microcut apparatus having two rotating blades to form a suspension of protein and an aqueous medium having a pH shown in Tables 5 and 6. Each protein composition made from muscle protein as described herein was injected into the animal muscle tissue of the species from which the protein compositions were obtained. The animal muscle tissue was then frozen followed by being cooked. Controls were supplied to which no protein was added. The animal muscle tissue samples were weighed prior to injection, subsequent to injection and subsequently to being cooked.

As shown in Table 5, moisture retention with the protein composition of this invention improved over moisture retention with the acidic protein composition by more than 2%.

As shown in Table 6, moisture retention with the protein composition of this invention improved the control by more than 15%.

EXAMPLE 3

This example illustrates that the protein composition made by the method of this invention provides an improved increase in moisture retention in pork as compared to an acidic protein composition not mixed with an alkaline composition. The acidic protein composition shown in Tables 7 and 8 (shown below) were processed by mixing comminuted pork protein with a food grade acidic composition comprising phosphoric acid to obtain a protein solution having a pH of 2.8. The protein compositions of this invention were obtained by mixing comminuted pork protein with a food grade acidic composition comprising phosphoric acid to obtain a pH of 2.8 in a first step. In a second step, a food grade alkaline composition comprising sodium hydroxide was added to the acidic protein solution to precipitate the protein having a pH of 5.5 or 7.3 (Tables 7 and 8 shown below). The precipitated protein in each instance was comminuted with a Stephan microcut apparatus having two blades to form a suspension of protein and an aqueous medium having a pH shown in Tables 7 and 8. Each protein composition made from muscle protein as described herein and 3 wt. % sodium chloride were mixed with comminuted pork. 50 ml distilled water then was added. The samples in a Nalgene Centrifuge bottle were shaken and then centrifuged at 3000 rpm for 10 minutes to remove excess water. Controls were supplied to which no protein was added. After centrifugation, the bottles were inverted over a wire screen for one minute. The animal muscle tissue samples were weighed prior to mixing, subsequent to mixing and subsequent to centrifugation. The water uptake was calculated by dividing the final sample weight by the initial premix weight X 100.

As shown in Table 7, moisture retention with the protein composition of this invention improved over moisture retention with the acidic protein composition by more that 5%.

As shown in Table 8, moisture retention with the protein composition of this invention improved over moisture retention with the acidic protein composition by more than 15%.

EXAMPLE 4

This example illustrates that the protein composition made by the method of this invention provides an improved increase in moisture retention in chicken as compared to an acidic protein composition not mixed with an alkaline composition. The acidic protein composition shown in Table 9 (shown below) were processed by mixing comminuted chicken muscle protein with a food grade acidic composition comprising phosphoric acid to obtain a protein solution having a pH of 2.8. The protein compositions of this invention were obtained by mixing comminuted chicken muscle protein with a food grade acidic composition comprising phosphoric acid to obtain a pH of 2.8 in a first step. In a second step, a food grade alkaline composition comprising sodium hydroxide was added to the acidic protein solution to precipitate the protein having a pH of 5.5 or 7.3 (Table 9 shown below). The precipitated protein in each instance was comminuted with a Stephan microcut apparatus having two rotating blades to form a suspension of protein and an aqueous medium having a pH shown in Table 9. The injectable compositions C1, C2, C3, C4, T1, T2 and T3 contain salt, starch and/or sodium tripolyphosphate as shown in Table 9. Each protein composition made from chicken muscle tissue as described herein was injected into the animal muscle tissue of chicken by a syringe (10 wt % added) and by vacuum tumbling (5wt. % added) for a total added weight of 15 wt %. The chicken muscle tissue was then cooked. Controls were supplied to which water was added at 3 wt. % but no protein was added. The animal muscle tissue samples were weighed prior to injection, subsequent to injection and subsequent to being cooked.

As shown in Table 9, moisture retention with the protein composition of this invention improved over moisture retention with the acidic protein composition by more than 9%.

EXAMPLE 5

This example illustrates that the protein composition made by the method of this invention provides an improved increase in moisture retention in fish as compared to an alkaline protein composition not first mixed with an acid composition. The alkaline protein compositions shown in Table 10 (shown below) were processed by mixing comminuted fish muscle protein with food grade sodium hydroxide composition to obtain a protein solution having a pH of 12.0 then was adjusted first with phosphoric acid to reduce the pH to 10.0 or 5.5 and then with sodium hydroxide to obtain a pH of 8.5, 10 or 11. The protein compositions of this invention were obtained by mixing comminuted fish muscle tissue with a food grade acidic composition comprising phosphoric acid to obtain a pH of 2.8 in a first step. In a second step, a food grade alkaline composition comprising sodium hydroxide was added to the acidic protein solution to precipitate the protein having a pH of 8.5 or 9.5 (Table 10, samples 5 and 6 shown below). The precipitated protein in each instance was comminuted with a Stephan microcut apparatus having two rotating blades to form a suspension of protein and an aqueous medium having a pH shown in Table 10. Each protein composition made from fish muscle tissue as described herein was injected into the animal muscle tissue of fish muscle tissue by a syringe (10 wt % added). The fish muscle tissue was then frozen and then thawed. Controls were supplied to which water was added at 3 wt. % but no protein was added. The animal muscle tissue samples were weighed prior to injection, subsequent to injection and subsequent to being thawed.

As shown in Table 10, moisture retention with the protein composition of this invention improved over moisture retention with the alkali protein composition by more than 5%.

TABLE 1

| Sample | pH | Species | Pre-Injection Weight (g) | Post-Injection Weight (g) | Pick Up Weight (g) | Pick Up % | Post Thaw Weight (g) | Post Thaw Loss (g) | Post Thaw Loss % | Net vs. Pre-Injection (green) Wt. % |
|---|---|---|---|---|---|---|---|---|---|---|
| 1 | Control | Pollock | 202.98 | 202.98 | 0.00 | 0.00 | 192.38 | 10.60 | 5.22% | 94.78% |
| 2 | 3.00 | Pollock | 192.97 | 213.78 | 20.81 | 10.78% | 192.63 | 21.15 | 9.89% | 99.82% |
| 3 | 5.50 | Pollock | 206.44 | 233.76 | 27.32 | 13.23% | 207.42 | 26.34 | 11.27% | 100.47% |
| 4 | 7.30 | Pollock | 200.39 | 235.56 | 35.17 | 17.55% | 214.76 | 20.80 | 8.83% | 107.17% |

TABLE 2

| Sample | pH | Species | Pre-Injection Weight (g) | Post-Injection Weight (g) | Pick Up Weight (g) | Pick Up % | Post Thaw Weight (g) | Post Thaw Loss (g) | Post Thaw Loss % | Net vs. Pre-Injection (green) Wt. % |
|---|---|---|---|---|---|---|---|---|---|---|
| 1 | Control | Cod | 188.67 | 188.67 | 0.00 | 0.00 | 187.33 | 1.34 | 0.71% | 98.66% |
| 2 | 3.00 | Cod | 192.37 | 222.01 | 29.64 | 15.41% | 196.11 | 25.90 | 11.67% | 103.74% |
| 3 | 5.50 | Cod | 195.62 | 228.78 | 33.16 | 16.95% | 205.49 | 23.29 | 10.18% | 109.87% |
| 4 | 7.30 | Cod | 194.19 | 236.66 | 42.47 | 21.87% | 207.64 | 29.02 | 12.26% | 113.45% |

TABLE 3

| Sample | pH | Species | Pre-Injection Weight (g) | Post-Injection Weight (g) | Pick Up Weight (g) | Pick Up % | Post Thaw Weight (g) | Post Thaw Loss (g) | Post Thaw Loss % | Net vs. Pre-Injection (green) Wt. % |
|---|---|---|---|---|---|---|---|---|---|---|
| 1 | Control | Shrimp | 62.04 | 62.04 | 0.00 | 0.00% | 59.89 | 2.15 | 3.47% | 96.53% |
| 2 | 3.00 | Shrimp | 59.73 | 68.23 | 8.50 | 14.23% | 64.32 | 3.91 | 5.73% | 107.68% |
| 3 | 5.50 | Shrimp | 58.13 | 66.50 | 8.37 | 14.40% | 65.29 | 1.21 | 1.82% | 112.32% |
| 4 | 7.30 | Shrimp | 60.11 | 69.31 | 9.20 | 15.31% | 66.72 | 2.59 | 3.74% | 111.00% |

TABLE 4

| Sample | pH | Species | Pre-Injection Weight (g) | Post-Injection Weight (g) | Pick Up Weight (g) | Pick Up Weight % | Post Thaw Weight (g) | Post Thaw Loss (g) | Post Thaw Loss % | Net vs. Pre-Injection (Green) Wt. % |
|---|---|---|---|---|---|---|---|---|---|---|
| 1 | Control | Pollock | 200.34 | 200.34 | 0.00 | 0.00% | 197.45 | 2.89 | 1.44% | 98.56% |
| 2 | 7.3 | Pollock | 202.12 | 222.11 | 19.99 | 9.89% | 210.23 | 11.88 | 5.35% | 104.01% |
| 3 | 7.8 | Pollock | 201.11 | 234.54 | 33.43 | 16.62% | 222.65 | 11.89 | 5.07% | 110.71% |
| 4 | 8.5 | Pollock | 199.89 | 225.12 | 25.23 | 12.62% | 213.27 | 11.85 | 5.26% | 106.69% |
| 5 | 9.5 | Pollock | 200.63 | 228.01 | 27.38 | 13.65% | 215.41 | 12.60 | 5.53% | 107.37% |

TABLE 5

| Sample | pH | Species | Pre-Injection Weight (g) | Post-Injection Weight (g) | Pick Up Weight (g) | Pick Up Weight % | Post Cook Weight (g) | Post Cook Loss (g) | Post Cook Loss % | Net vs. Pre-Injection (Green) Wt. % |
|---|---|---|---|---|---|---|---|---|---|---|
| 1 | Control | Shrimp | 26.11 | 26.11 | 0.00 | 0.00% | 24.11 | 2.00 | 7.66% | 92.34% |
| 2 | 3.00 | Shrimp | 28.39 | 32.67 | 4.28 | 15.08% | 32.05 | 0.62 | 1.90% | 112.89% |
| 3 | 5.50 | Shrimp | 30.72 | 35.86 | 5.14 | 16.73% | 35.39 | 0.47 | 1.31% | 115.20% |
| 4 | 7.50 | Shrimp | 27.47 | 32.02 | 4.55 | 16.56% | 31.52 | 0.50 | 1.56% | 114.74% |

TABLE 6

| Sample | pH | Species | Pre-Injection Weight (g) | Post-Injection Weight (g) | Pick Up Weight (g) | Pick Up Weight % | Post Cook Weight (g) | Post Cook Loss (g) | Post Cook Loss % | Net vs. Pre-Injection (Green) Wt. % |
|---|---|---|---|---|---|---|---|---|---|---|
| 1 | Control | Pollock | 454.23 | 454.23 | 0.00 | 0.00% | 352.76 | 101.47 | 22.34% | 77.66% |
| 2 | 8.50 | Pollock | 455.65 | 501.65 | 46.00 | 10.10% | 425.77 | 75.88 | 15.13% | 93.44% |

TABLE 7

| Series 1 | | | | |
|---|---|---|---|---|
| | Bottle Weight (g) | Premix Weight | Post Centrifuge Weight (G) (Bottle and Premix) | Water Uptake Net Result % |
| 1 Ground Pork Loin (GPL) | 78.54 | 24.76 | 107.60 | 117.37% |
| 2 GPL + 2.8 Pork Protein & 3% Salt | 78.71 | 25.19 | 107.07 | 112.58% |
| 3 GPL + 5.5 pH Pork Protein & 3% Salt | 78.41 | 25.66 | 108.62 | 117.73% |
| 4 GPL + 7.3 pH Pork Protein & 3% Salt | 78.63 | 25.04 | 108.07 | 117.57% |

TABLE 8

| Series 2 | | | | |
|---|---|---|---|---|
| | Bottle Weight (g) | Premix Weight(g) | Post Centrifuge Weight (G) (Bottle and Premix) | Water Uptake Net Result % |
| 1 Ground Pork Loin (GPL) | 78.44 | 24.89 | 107.23 | 115.67% |
| 2 GPL + 2.8 Pork Protein & 3% Salt | 79.68 | 25.66 | 106.99 | 106.43% |
| 3 GPL + 5.5 pH Pork Protein & 3% Salt | 78.41 | 25.07 | 108.83 | 121.34% |
| 4 GPL + 7.3 pH Pork Protein & 3% Salt | 78.70 | 24.83 | 108.23 | 118.93% |

TABLE 9

| Variations Controls | | | | | | | | | |
|---|---|---|---|---|---|---|---|---|---|
| C1 | 95.00% | Water | 3.00% | Salt | 0.00% | Starch | 2.00% | Phosphate |
| C2 | 95.00% | Water | 3.00% | Salt | 2.00% | Starch | 0.00% | Phosphate |

TABLE 9-continued

| | | | | | | | | | |
|---|---|---|---|---|---|---|---|---|---|
| C3 | | 93.00% | Water | 3.00% | Salt | 2.00% | Starch | 2.00% | Phosphate |
| C4 | | 97.00% | Water | 3.00% | Salt | 0.00% | Starch | 0.00% | Phosphate |

Protein-Test Samples

| | | | | | | | | | |
|---|---|---|---|---|---|---|---|---|---|
| T1 | 2.8 pH | 63.00% | Protein | 31.00% | Water | 3.00% | Salt | 3.00% | Starch |
| T2 | 5.5 pH | 63.00% | Protein | 31.00% | Water | 3.00% | Salt | 3.00% | Starch |
| T3 | 7.3 pH | 63.00% | Protein | 31.00% | Water | 3.00% | Salt | 3.00% | Starch |

| Sample | pH | Species | Pre-Injection Tumble/Weight (g) | Post-Injection Tumble/Weight (g) | Pick Up Weight | Pick Up % | Post Cook Weight | Post Cook Loss (g) | Post Cook Loss % | Net vs. Pre-Injection (Green) Wt. % |
|---|---|---|---|---|---|---|---|---|---|---|
| C1 | Control | Chicken | 334.00 | 377.00 | 43.00 | 12.87% | 270.00 | 107.00 | 28.38% | 80.84% |
| C2 | Control | Chicken | 305.00 | 348.00 | 43.00 | 14.10% | 259.00 | 89.00 | 25.57% | 84.92.% |
| C3 | Control | Chicken | 331.00 | 373.00 | 42.00 | 12.69% | 281.00 | 92.00 | 24.66% | 84.89% |
| C4 | Control | Chicken | 319.00 | 363.00 | 44.00 | 13.79% | 255.00 | 108.00 | 29.75% | 79.94% |
| T1 | 2.80 | Chicken | 400.00 | 463.00 | 63.00 | 15.75% | 340.00 | 123.00 | 26.57% | 85.00% |
| T1 | 2.80 | Chicken | 439.00 | 498.00 | 59.00 | 13.44% | 372.00 | 126.00 | 25.30% | 84.74% |
| T2 | 5.50 | Chicken | 477.00 | 551.00 | 74.00 | 15.51% | 436.00 | 115.00 | 20.87% | 91.40% |
| T2 | 5.50 | Chicken | 443.00 | 505.00 | 62.00 | 14.00% | 392.00 | 113.00 | 22.38% | 88.49% |
| T3 | 7.30 | Chicken | 452.00 | 518.00 | 66.00 | 14.60% | 425.00 | 93.00 | 17.95% | 94.03% |
| T3 | 7.30 | Chicken | 316.00 | 363.00 | 47.00 | 14.87% | 272.00 | 91.00 | 25.07% | 86.08% |
| T3 | 7.30 | Chicken | 326.00 | 379.00 | 53.00 | 16.26% | 280.00 | 99.00 | 26.12% | 85.89% |

TABLE 10

| Sample | | |
|---|---|---|
| 1 | 12 pH to 10 pH | |
| 2 | 12 pH to 5.5 pH to 8.5 pH | |
| 3 | 12 pH to 5.5 pH to 10 pH | |
| 4 | 12 pH to 5.5 pH to 11 Ph | |
| 5 | 2.8 pH to 8.5 pH | |
| 6 | 6.2 pH to 9.5 ph | |

| Sample | pH | Species | Pre-Injection Weight (g) | Post-Injection Weight (g) | Pick Up Weight (g) | Pick Up % | Post Thaw Weight (g) | Post Thaw Loss (g) | Post Thaw Loss % | Net vs. Pre-Injection (Green) Wt. % |
|---|---|---|---|---|---|---|---|---|---|---|
| 1 | 10 | Pollock | 126.59 | 134.68 | 8.09 | 6.39% | 121.49 | 13.19 | 9.79% | 95.97% |
| 2 | 8.50 | Pollock | 105.35 | 113.20 | 7.85 | 7.45% | 105.96 | 7.24 | 6.40% | 100.58% |
| 3 | 10.00 | Pollock | 103.48 | 115.22 | 11.74 | 11.35% | 105.59 | 9.63 | 8.36% | 102.04% |
| 4 | 11.00 | Pollock | 110.56 | 124.50 | 13.94 | 12.61% | 113.17 | 11.33 | 9.10% | 102.36% |
| 5 | 8.5 | Pollock | 199.89 | 225.12 | 25.23 | 12.62% | 213.27 | 11.85 | 5.26% | 106.69% |
| 6 | 9.5 | Pollock | 200.63 | 228.01 | 27.38 | 13.65% | 215.41 | 12.60 | 5.53% | 107.37% |

What is claimed is:

1. An injectable salted aqueous suspension of functional animal muscle tissue protein composition for use during a food processing injection procedure with at least one injection pathway wherein said salted aqueous suspension of functional animal muscle tissue comprises sarcoplasmic proteins and myofibrillar proteins derived from animal muscle tissue obtained by the process comprising the steps of:
   a. comminuting animal muscle tissue to form comminuted animal muscle tissue,
   b. mixing said comminuted animal muscle tissue with a food grade acid composition to solubilize animal muscle protein thereby forming an aqueous acidic solution of animal muscle protein wherein step a and step b are performed simultaneously or in order,
   c. then mixing said aqueous acidic solution with a food grade alkaline composition to precipitate the animal muscle protein in solution to form an aqueous suspension of animal muscle protein particulates, wherein steps b and c are performed without addition of salt apart from the food grade acid composition added in step b and the food grade alkaline composition added in step c,
   d. then adding salt apart from the food grade acid composition of step b and the food grade alkaline composition of step c to said aqueous suspension of step c to form a salted aqueous suspension of animal muscle protein, and
   e. then comminuting said salted aqueous suspension of step d of animal muscle protein to form the injectable salted aqueous suspension of functional animal muscle tissue protein composition including sarcoplasmic proteins and myofibrillar proteins;
   whereby said injectable salted aqueous suspension is flowable through the at least one injection pathway during an injection procedure without blocking the at least one injection pathway; and
   wherein said injectable salted aqueous suspension, when added to animal muscle tissue, retains moisture.

2. The injectable salted aqueous suspension of claim 1, wherein aqueous acidic solution of Step b) has a pH between about 2.0 and about 3.7.

3. The injectable salted aqueous suspension of claim 1, wherein aqueous acidic solution of Step b) has a pH between about 2.5 and about 3.5.

4. The injectable salted aqueous suspension of claim 1, wherein the aqueous suspension of animal muscle protein particulates of Step c) has a pH between about 4.7 and about 9.5.

5. The injectable salted aqueous suspension of claim 4, wherein the aqueous suspension of animal muscle protein particulates of Step c) has a pH between about 5.5 and about 9.5.

6. The injectable salted aqueous suspension of claim 1, wherein when added to animal muscle tissue to retain moisture, said the injectable salted aqueous suspension of functional animal muscle tissue protein composition is injected into said animal muscle tissue at a weight ratio between about 0.03% and about 18% by weight of the injectable salted aqueous suspension of functional animal muscle tissue composition to said animal muscle tissue.

7. The injectable salted aqueous suspension of claim 2, wherein when said animal muscle tissue is cooked with said injectable salted aqueous suspension of functional animal muscle protein composition, the animal muscle tissue weighs between about 1% and about 20% greater than an animal muscle tissue not cooked with said injectable salted aqueous suspension.

8. The injectable salted aqueous suspension of claim 2, wherein when said animal muscle tissue is thawed with said injectable salted aqueous suspension of functional animal muscle protein composition, the animal muscle tissue weighs between about 4% and about 15% greater than an animal muscle tissue not thawed with said injectable salted aqueous suspension.

9. The injectable salted aqueous suspension of claim 1 wherein the injection of the salted aqueous suspension of functional animal muscle tissue protein composition is followed by vacuum tumbling.

10. The injectable salted aqueous suspension of claim 1 wherein said injectable salted aqueous suspension is added to animal muscle tissue by injection with a syringe or by vacuum tumbling.

11. The injectable salted aqueous suspension of claim 1 wherein membrane lipids are separated from said aqueous acidic solution of animal muscle protein.

12. The injectable salted aqueous suspension of claim 1 wherein the salt added during step d is sodium chloride.

13. The injectable salted aqueous suspension of claim 1 said food grade acid composition is citric acid and said food grade alkaline composition is sodium bicarbonate.

14. The injectable salted aqueous suspension of claim 1 wherein the animal muscle tissue is selected from the group consisting of fish muscle tissue, poultry muscle tissue, beef muscle tissue, pork muscle tissue, and lamb muscle tissue.

15. The injectable salted aqueous suspension of claim 14 wherein the poultry muscle tissue is taken from the group consisting of chicken muscle tissue and turkey muscle tissue.

16. The injectable salted aqueous suspension of claim 14 wherein the fish muscle tissue is shellfish muscle tissue.

17. The injectable salted aqueous suspension of claim 15 wherein the shellfish muscle tissue is shrimp muscle tissue.

18. An animal muscle tissue composition having retained moisture obtained by a process comprising the steps of:
1. adding an injectable salted aqueous suspension of functional animal muscle tissue protein composition to said animal muscle tissue at a weight ratio between about 0.03% and about 18% by weight of the injectable salted aqueous suspension of functional animal muscle tissue composition to said animal muscle tissue, whereby said injectable salted aqueous suspension of functional animal muscle tissue protein composition is injected into said animal muscle tissue, and
2. cooking or thawing said animal muscle tissue with said injectable salted aqueous suspension of functional animal muscle protein composition from step a, wherein, after cooking, the animal muscle tissue weighs between about 1% and about 20% greater than an animal muscle tissue not subjected to step a, or wherein, after thawing, the animal muscle tissue weighs between about 4% and about 15% greater than an animal muscle tissue not subjected to step a;

wherein the injectable salted aqueous suspension of functional animal muscle tissue protein composition is for use during a food processing injection procedure with at least one injection pathway, and wherein said salted aqueous suspension of functional animal muscle tissue comprises sarcoplasmic proteins and myofibrillar proteins derived from animal muscle tissue and is obtained by the process comprising the steps of:
a. comminuting animal muscle tissue to form comminuted animal muscle tissue,
b. mixing said comminuted animal muscle tissue with a food grade acid composition to solubilize animal muscle protein thereby forming an aqueous acidic solution of animal muscle protein, wherein step a and step b are performed simultaneously or in order,
c. then mixing said aqueous acidic solution with a food grade alkaline composition to precipitate the animal muscle protein in solution to form an aqueous suspension of animal muscle protein particulates, wherein steps b and c are performed without addition of salt apart from the food grade acid composition added in step b and the food grade alkaline composition added in step c,
d. then adding salt apart from the food grade acid composition of step b and the food grade alkaline composition of step c to said aqueous suspension of step c to form a salted aqueous suspension of animal muscle protein, and
e. then comminuting said salted aqueous suspension of step d of animal muscle protein to form the injectable salted aqueous suspension of functional animal muscle tissue protein composition including sarcoplasmic proteins and myofibrillar proteins;

whereby said injectable salted aqueous suspension is flowable through the at least one injection pathway during an injection procedure without blocking the at least one injection pathway.

19. The animal muscle tissue composition of claim 16, wherein aqueous acidic solution of Step b) has a pH between about 2.0 and about 3.7.

20. The animal muscle tissue composition of claim 16, wherein the aqueous suspension of animal muscle protein particulates of Step c) has a pH between about 4.7 and about 9.5.

21. The process for forming an injectable salted aqueous suspension of functional animal muscle tissue protein composition for use during a food processing injection procedure with at least one injection pathway wherein said injectable salted aqueous suspension of functional animal muscle tissue comprises sarcoplasmic proteins and myofibrillar proteins, said process comprising:
a. comminuting animal muscle tissue to form comminuted animal muscle tissue, b. mixing said comminuted animal muscle tissue with a food grade acid composition to solubilize animal muscle protein thereby forming an aqueous acidic solution of animal muscle protein, wherein step a and step b are performed simultaneously or in order,
c. then mixing said aqueous acidic solution with a food grade alkaline composition to form an aqueous suspension of animal muscle protein particulates, wherein steps b and c are performed without addition of salt apart from the food grade acid composition added in step b and the food grade alkaline composition added in step c,
d. then adding salt apart from the food grade acid composition of step b and the food grade alkaline composition of step c to the aqueous suspension of step c to form a salted aqueous suspension of animal muscle protein, and
e. then comminuting said salted aqueous suspension of step d of animal muscle protein to form the injectable salted aqueous suspension of functional animal muscle tissue protein composition including sarcoplasmic proteins and myofibrillar proteins;

whereby said injectable salted aqueous suspension is flowable through the at least one injection pathway during an injection procedure without blocking the at least one injection pathway; and wherein said injectable salted aqueous suspension, when added to animal muscle tissue, retains moisture.

22. The process of claim 21, wherein aqueous acidic solution of Step b) has a pH between about 2.0 and about 3.7.

23. The process of claim 21, wherein the aqueous suspension of animal muscle protein particulates of Step c) has a pH between about 4.7 and about 9.5.

24. The process of claim 21, further comprising injecting said comminuted salted aqueous suspension through the at least one injection pathway.

25. The process of claim 21, comprising injecting said comminuted salted aqueous suspension through the at least one pathway, wherein said injecting step is performed by syringe or by vacuum tumbling.

* * * * *